(12) United States Patent
Wang

(10) Patent No.: US 6,281,887 B1
(45) Date of Patent: Aug. 28, 2001

(54) TOUCHPAD ASSEMBLY

(75) Inventor: Jiann Bin Wang, Taipei Hsien (TW)

(73) Assignee: MITAC International Corp., Hsinchu (TW)

( * ) Notice: Subject to any disclaimer, the term of this patent is extended or adjusted under 35 U.S.C. 154(b) by 0 days.

(21) Appl. No.: 09/399,140

(22) Filed: Sep. 20, 1999

(51) Int. Cl.[7] ................................................ G09G 5/00
(52) U.S. Cl. .................................... 345/173; 361/683
(58) Field of Search ................................. 345/173, 905, 345/168, 157; 341/22, 33, 34; 361/212, 220, 683, 686

(56) References Cited

U.S. PATENT DOCUMENTS

| | | | | |
|---|---|---|---|---|
| 5,793,355 | * | 8/1998 | Youens ................................. | 345/157 |
| 5,920,310 | * | 7/1999 | Faggin et al. ......................... | 345/173 |
| 6,177,924 | * | 1/2001 | Bae ....................................... | 361/683 |

* cited by examiner

*Primary Examiner*—Regina Liang
(74) *Attorney, Agent, or Firm*—Baker Botts, L.L.P.

(57) ABSTRACT

A touchpad assembly includes a conductive base member having a looped frame, a plurality of spaced apart resilient touchpad supporting fingers that extend inwardly from the looped frame, and a resilient switch actuating finger that extends outwardly from the looped frame. The touchpad supporting fingers establish tight contact with the bottom side of a touchpad member to serve as a discharge path for static electricity. A key switch is disposed beneath the switch actuating finger, and a keypad member is mounted on a top side of the switch actuating finger. The keypad member is operable so as to bend the switch actuating finger relative to the looped frame and actuate the key switch.

6 Claims, 3 Drawing Sheets

TOUCHPAD ASSEMBLY

BACKGROUND OF THE INVENTION

1. Field of the Invention

The present invention relates to a touchpad assembly, more particularly to a touchpad construction that has a reduced height.

2. Description of the Related Art

Input devices are required for a computer to allow a user to move a cursor to various locations in a computer display. Many types of user input devices have evolved to allow a user to efficiently operate within a graphical user interface (GUI) environment. Touchpads are among the most popular devices available in the market. With the trend toward minimizing the thickness of notebook computers, the reduction in the height of a touchpad input device is a quite important design consideration for a notebook computer. Moreover, the durability of keys of the touchpad is also an important factor in valuation of the same.

A known structure of a touchpad assembly for a notebook computer is shown in FIGS. 1 and 2. A base member 11 made of plastic material supports a touchpad member 10 thereon and is mounted at a rear part 12 on a portion of the notebook computer. A pair of arms 13 extends forwardly from the rear part 12 of the touchpad member 10, and a keypad 14 extends from the free end of each arm 13. A push bar 15 is provided on the bottom side of the keypad 14, and is used to actuate a corresponding key switch 16 when a pressing force is applied by the user on the respective keypad 14.

The keypad 14 springs back to a normal position when released from the pressing force, owing to the flexibility of the cantilevered arm 13. Because the keypads 14 are frequently pressed during use of the computer, the arms 13 and the keypads 14 must be of considerable thickness in order to provide sufficient durability. The thickness of the arms 13 and the keypads 14 in this conventional construction is generally around 2 mm, which is too thick for application in most laptop computers. Moreover, the frequent operation of the keypad 14 and the arm 13 may eventually result in failure due to material fatigue.

In addition, the touchpad member 10 is often damaged and malfunctions during an electrostatic discharge (ESD) test, where static electricity of several kilovolts is applied by a static generator. For this sake, the touchpad member 10 must be provided with grounding elements in order to dissipate static charge. This leads to a complicated construction and increases the production cost.

SUMMARY OF THE INVENTION

Therefore, the main object of the present invention is to provide a touchpad assembly with a reduced height.

Another object of the present invention is to provide a touchpad assembly, which allows rapid dissipation of static charges to protect a touchpad member from damage and malfunction.

Accordingly, the touchpad assembly of this invention comprises: a touchpad member having a bottom side; a conductive base member including a looped frame, a plurality of spaced apart resilient touchpad supporting fingers that extend inwardly from the looped frame, and a resilient switch actuating finger that extends outwardly from the looped frame, the touchpad supporting fingers establishing tight contact with the bottom side of the touchpad member to serve as a discharge path for static electricity; a key switch disposed beneath the switch actuating finger; and a keypad member mounted on a top side of the switch actuating finger, the keypad member being operable so as to bend the switch actuating finger relative to the looped frame and actuate the key switch.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
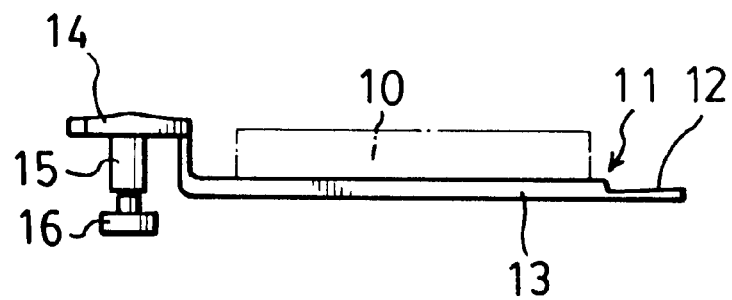
FIG. 1 is a side view of the touchpad assembly in the prior art.
Figure 2:
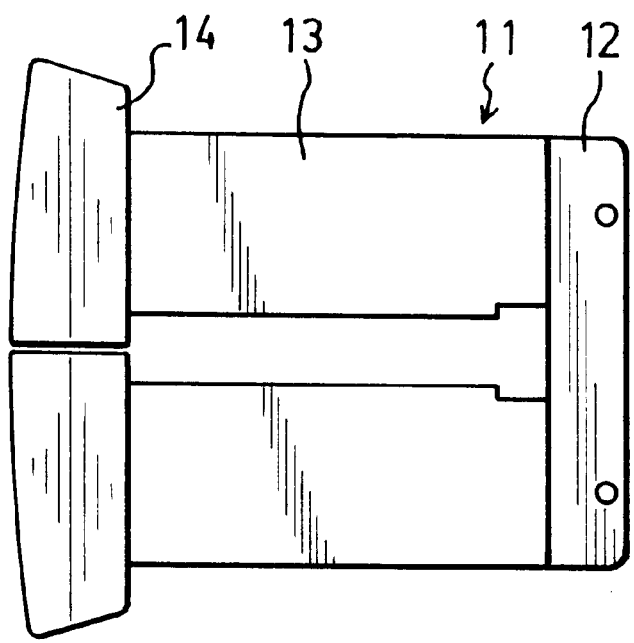
FIG. 2 is a top view of a base member of the touchpad assembly shown in FIG. 1.
Figure 3:
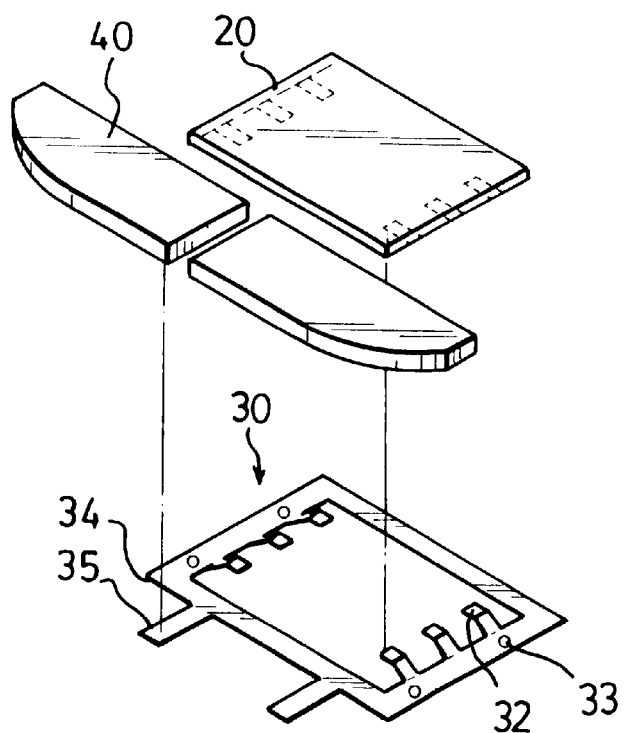
FIG. 3 is an exploded perspective view of the preferred embodiment of the touchpad assembly according to the present invention.
Figure 4:
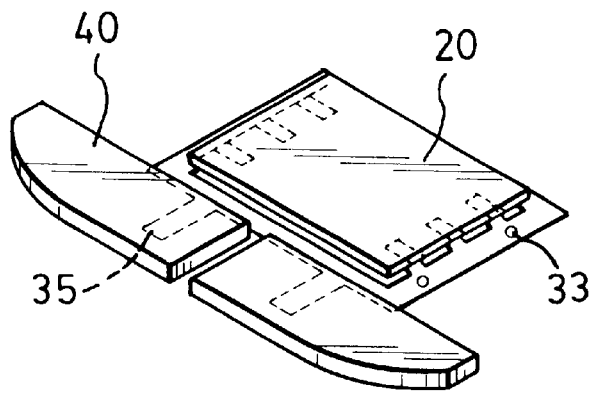
FIG. 4 is an assembled perspective view of the preferred embodiment.

Referring to FIGS. 3 and 4, the preferred embodiment of a touchpad assembly according to the present invention is shown to generally comprise a touchpad member 20, a base member 30 and a pair of keypad members 40.

Figure 5:
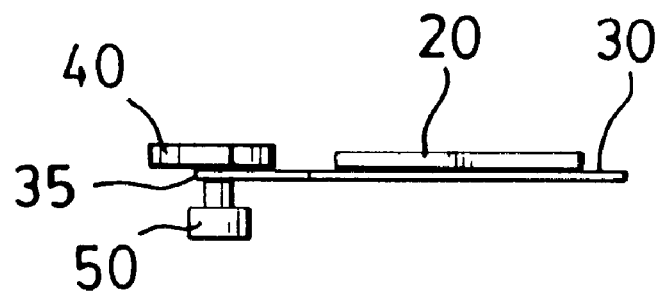
FIG. 5 is a side view of the preferred embodiment.

The base member 30 includes a looped rectangular frame and is formed from a conductive sheet material. The base member 30 is formed with holes 33 at two sides thereof for mounting on a surface of a notebook computer (not shown). A plurality of spaced apart resilient touchpad supporting fingers 32 extend integrally and inwardly from left and right sides of the looped rectangular frame such that the touchpad supporting fingers 32 on the opposite left and right sides are aligned with each other. A pair of switch actuating fingers 35 extends from a front side 34 of the looped rectangular frame. Each of the switch actuating fingers 35 extends above a corresponding key switch 50 (see FIGS. 5 and 6). Preferably, the base member 30 is fabricated from a stainless steel sheet with a thickness of about 0.3 mm, thereby providing the base member 30 with an excellent spring-back property.

Figure 6:
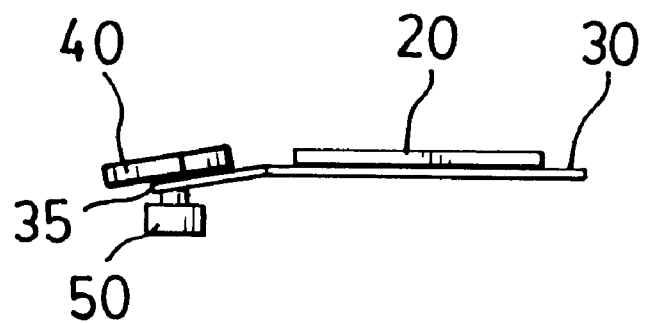
FIG. 6 is another side view of the preferred embodiment showing a keypad member thereof in an operated state.

The keypad members 40 are mounted on a top side of the switch actuating fingers 35 of the base member 30 such that the key switches 50 can be actuated, as shown in FIG. 6, through the bending of the switch actuating fingers 35 relative to the looped rectangular frame when a pressing force is applied to the corresponding keypad members 40. The keypad members 40 spring back to the normal position shown in FIG. 5 when released from the pressing force as a result of the elastic property of the metal material which constitutes the base member 30.

Referring again to FIG. 4, the bottom side of the touchpad member 20 establishes tight contact with distal ends of the touchpad supporting fingers 32 that are bent upwardly. When electrostatic discharge occurs in the vicinity of the touchpad member 20, most of the static electricity will be dissipated through the conductive base member 30, and the remaining may dissipate through the touchpad supporting fingers 32 and the grounding circuit of the notebook computer. The arrangement as such can thus prevent damage and malfunction of the touchpad member 20.

From the foregoing description, it is understood that the switch actuating fingers 35 of the base member 30 can be pressed independently because of the resiliency of the material used for the same. This makes it possible to construct the touchpad assembly with a lower profile. Moreover, a better spring-back action for the keypad members 40 is also achieved.

Furthermore, it is obvious that the switch actuating fingers 35 can be bent to a certain degree, thus enhancing the sensitivity of the keypad members 40 during operation.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A touchpad assembly comprising:
   a touchpad member having a bottom side;
   a conductive base member including a looped frame, a plurality of spaced apart resilient touchpad supporting fingers that extend inwardly from said looped frame, and a resilient switch actuating finger that extends outwardly from said looped frame, said touchpad supporting fingers establishing tight contact with said bottom side of said touchpad member to serve as a discharge path for static electricity;
   a key switch disposed beneath said switch actuating finger; and
   a keypad member mounted on a top side of said switch actuating finger, said keypad member being operable so as to bend said switch actuating finger relative to said looped frame and actuate said key switch.

2. The touchpad assembly as defined in claim 1, wherein said base member is formed integrally from a stainless steel sheet.

3. The touchpad assembly as defined in claim 1, wherein said touchpad supporting fingers have distal ends that are bent upwardly for establishing tight contact with said bottom side of said touchpad member.

4. The touchpad assembly as defined in claim 1, wherein said looped frame is formed as a rectangular loop having a front side, a rear side, and left and right sides that cooperatively confine a central opening.

5. The touchpad assembly as defined in claim 4, wherein said touchpad supporting fingers extend from said left and right sides of said looped frame.

6. The touchpad assembly as defined in claim 4, wherein said switch actuating finger extends from said front side of said looped frame.

* * * * *